V. PUC.
SAFETY PIN.
APPLICATION FILED AUG. 6, 1919.
1,415,475.
Patented May 9, 1922.
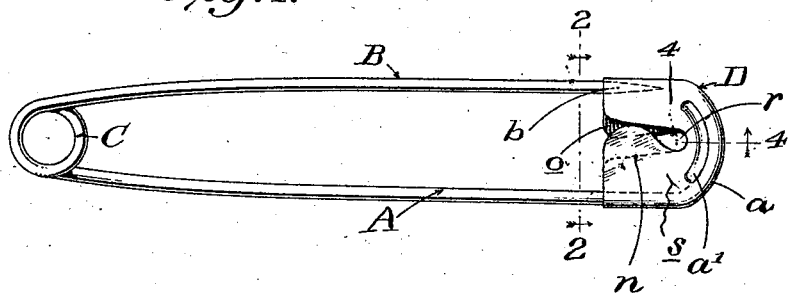
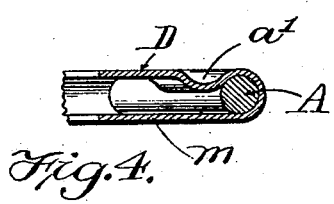
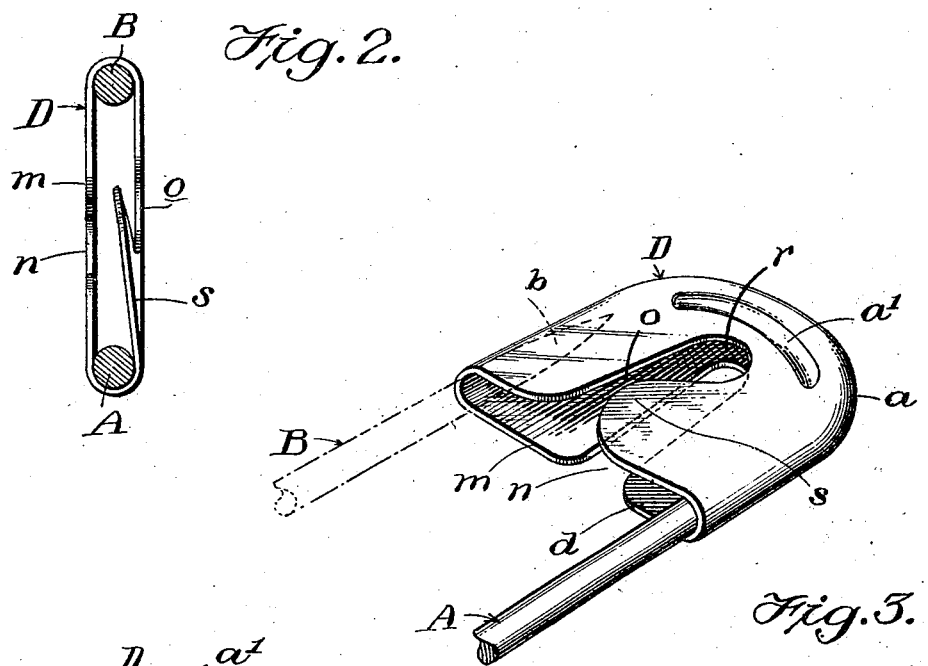
Inventor
Vojtéch Puc
By his Attorneys

UNITED STATES PATENT OFFICE.

VOJTĚCH PUC, OF PRAGUE-VINOHRADY, BOHEMIA.

SAFETY PIN.

1,415,475. Specification of Letters Patent. Patented May 9, 1922.

Application filed August 6, 1919. Serial No. 315,620.

(GRANTED UNDER THE PROVISIONS OF THE ACT OF MARCH 3, 1921, 41 STAT. L., 1313.)

*To all whom it may concern:*

Be it known that I, VOJTĚCH PUC, a citizen of the Czecho-Slovak Republic, residing in Prague-Vinohrady, Bohemia, have invented certain new and useful Improvements in Safety Pins, for which I have filed applications in Germany, filed July 31, 1916, patented Oct. 24, 1916, No. 300,242; in Spain, filed Sept. 19, 1919, patented Jan. 20, 1920, No. 71,418; in Denmark, filed Sept. 19, 1919, patented Aug. 25, 1920, No. 26,575, of which the following is a specification.

This invention relates to safety pins, in which the pointed end, the spring and the stationary member are made of a single piece of wire and in which a guard is provided for the point of the pin and for supporting the inner end of the stationary member of the pin. My improvements especially relate to the particular construction of the guard, and consist in a novel way of forming the guard with recesses or slots, through which the pointed end of the pin is adapted to pass, and a guide which directs the pin when entering the guard or leaving it.

In the accompanying drawing:—

Figure 1 is an elevation of a safety pin with my improvements applied.

Figure 2 shows a transverse section on the line 2—2 of Fig. 1.

Figure 3 is a perspective view, on an enlarged scale, of the guard, showing it associated with the stationary member of the pin and the pointed member.

Figure 4 shows a section on the line 4—4 of Fig. 1.

The stationary member A, the pointed member B and the coiled wire spring C may be of usual construction. The guard D is, in general, of well known type, the end $a$ of the stationary member being fixed therein while the pointed end $b$ of the pointed member is adapted to move in and out of the guard.

As indicated most clearly in Figure 4, the inner end of the stationary member is fixed in the guard by forming a crescent-shaped depression $a'$ in the guard which forms a similarly shaped rib.

As most clearly shown in Figure 3 the guard is made of sheet metal closed at its end and at the sides, one side $d$ being adapted to receive the end of the stationary member A. The bottom $m$ of the guard is flat or straight and is formed with a slot $n$ which extends inwards from the edge of the guard towards the outer end thereof, being slightly inclined from the middle longitudinal axis towards the opposite side of the guard. The upper side of the guard is formed with a slot $o$ which extends inward from the inner edge of the guard towards the outer end thereof. This slot is relatively wide at its entrance, is narrow in its middle portion and is considerably enlarged at its inner end $r$. $s$ indicates a tongue on one side of the slot which extends over the slot $n$ to afford a guide for the pointed end of the pin.

Figure 1 of the drawing shows the pin closed. When the pin is opened it will naturally pass out of the slot $n$ and the pin may be closed by returning the pointed end of the pin through the same slot. The pin may also be opened by passing its pointed end out through the slot $o$, over the guide $s$, and in closing the pin it is most convenient to place the pointed end on top of the tongue $s$ and allow the pin to find its seat in the guard.

It will be observed that the guard does not entirely or closely surround the member A and that no shoulders or obstructions are made in the tongue or that part of the guard over which the pointed end of the pin slides, the member A being held firmly in place by the crescent-shaped depression and rib $a'$. The recesses or slots $n$ overlap; i. e., they are inclined in opposite directions so that the pointed end of the pin may be removed from either side of the guard most easily. It will be observed, also, that the tongue $s$ is inclined from the top of the guard inwards and downwards and this affords a smooth and easy path for the point in either opening or closing the pin.

I claim as my invention:—

1. A safety pin, comprising a stationary member, a movable pointed member connected by a coil, and a sheet metal guard, one side of which is formed with a diagonal slot and is flat and straight between the stationary and pointed members and the opposite side of which is formed with a diagonal slot and provided with a tongue of single thickness extending without bend from the extreme outer side of the stationary member diagonally inwards toward the opposite side of the guard across the slot therein.

2. A safety pin comprising a stationary member, a pointed member, and a guard to which the end of the stationary member is secured and which is provided on one side with a diagonally arranged slot and on the opposite side with a slot also arranged diagonally but having an enlarged part at its inner end, said guard being also formed with a tongue of single thickness which is inclined inward from one member toward the other to form a guide for the pointed end of the pin, the outer end of said tongue being disposed between the slot on one side of the guard, and the fixed member of the pin, while the inner portion of the tongue extends directly without bend from the adjacent portion of the stationary member toward the pointed member.

In testimony whereof, I have hereunto subscribed my name.

VOJTĚCH PUC.